United States Patent
Farinola

(10) Patent No.: US 6,615,891 B2
(45) Date of Patent: Sep. 9, 2003

(54) TIRE BUILDING DRUM

(75) Inventor: Luca Farinola, Rome (IT)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/892,940

(22) Filed: Jun. 27, 2001

(65) Prior Publication Data

US 2001/0054485 A1 Dec. 27, 2001

(51) Int. Cl.[7] .............................. B29D 30/26
(52) U.S. Cl. .................. 156/401; 156/398; 156/415; 156/416
(58) Field of Search ................ 156/132, 135, 156/401, 398, 400, 414–416

(56) References Cited

U.S. PATENT DOCUMENTS

| 4,007,081 A | | 2/1977 | Mallory |
| 4,214,939 A | * | 7/1980 | Enders ..................... 156/401 |
| 4,226,656 A | * | 10/1980 | Appleby et al. ........... 156/132 |
| 4,243,451 A | * | 1/1981 | Kortman .................. 156/132 |
| 4,247,356 A | | 1/1981 | Spach et al. |
| 4,508,586 A | | 4/1985 | Brown et al. |
| 4,683,021 A | * | 7/1987 | Stalter et al. ............. 156/415 |
| 4,976,804 A | * | 12/1990 | Kneip ...................... 156/401 |
| 5,468,328 A | | 11/1995 | Kim et al. |

* cited by examiner

Primary Examiner—Geoffrey L. Knable
(74) Attorney, Agent, or Firm—Michael R. Huber; Michael Sand

(57) ABSTRACT

A drum (1) for building tires (2), the drum (1) having two half-drums (12), each of which has an expandable bead clamping device (20), and at least one shaping bladder (27) and a turn-up bladder (33) fixed to an outer tubular body (16) of the half-drum (12) on opposite sides of the respective bead clamping device (20); each turn-up bladder (33) having an outer annular lip (34) extending, at rest, along the respective half-drum (12) and covering the respective bead clamping device (20) and substantially the whole respective shaping bladder (27).

4 Claims, 2 Drawing Sheets

TIRE BUILDING DRUM

FIELD OF THE INVENTION

The present invention relates to a tire building drum.

BACKGROUND OF THE INVENTION

Tires comprising a carcass with two bead bundles are normally formed on a building drum, also known as a tire forming drum, comprising a cylindrical central body, and two half-drums located on opposite sides of the central body and moved in opposite directions along a common axis by a central actuating device. Each half-drum comprises an expandable bead clamping device normally defined by a ring of sectors, which are movable, by a normally pneumatic actuator, substantially radially with respect to the drum axis and to and from an expanded position clamping a respective bead bundle in a given axial position along the half-drum and on the outside of a carcass, of a tire being formed, lying in an initially flat position on the building drum.

Each half-drum also comprises at least one shaping bladder which lies flat at rest on the half-drum, between the respective bead clamping device and the central body, and is inflatable to shape the carcass; and at least one turn-up bladder which lies flat at rest on the half-drum on the opposite side of the bead clamping device with respect to the shaping bladder, and is inflatable to turn a lateral portion of a body ply of the tire being formed outwardly up about the respective bead bundle.

Each turn-up bladder of building drums of the above type normally comprises an annular lip, which extends towards the respective shaping bladder to cover the sectors of the respective bead clamping device while leaving the entire outer surface of the shaping bladder clear. The turn-up bladder and provides, among other things, for preventing the expanding sectors of the respective bead clamping device from "marking" the surface of the coating skim of the carcass, and for keeping the respective turn-up bladder as close as possible to the respective bead clamping device when shaping the carcass.

A major drawback of known building drums of the above type lies in each shaping bladder necessarily sliding, when shaping the carcass, in contact with the coating skim of the carcass. Being still green, the coating skim would be ruined by adhering to the outer surfaces of the shaping bladders if it were not lubricated with oil, which is not only expensive but also takes a relatively long time to apply and creates difficulties at the curing stage.

Moreover, for known forming drums of the above type, because of the relatively small transverse dimension of each annular lip and the oil applied to the coating skim of the carcass, the annular lips will tend to separate from the bead clamping devices. From the sectors of the respective bead clamping device, the coating skim of the carcass is left unprotected and, more importantly, the respective bead bundle is thereby free to move axially with respect to the body ply.

SUMMARY OF THE INVENTION

One aspect of the present invention is to provide a building drum designed to eliminate the aforementioned drawbacks.

According to the present invention, there is provided a drum for building tires, the drum comprising two half-drums, each of which comprises a substantially cylindrical outer tubular body, a bead clamping device expandable through said tubular body, at least one shaping bladder, first fastening means for connecting said shaping bladder to said tubular body, a turn-up bladder having an outer annular lip extending towards the respective shaping bladder, and second fastening means for connecting said turn-up bladder to said tubular body on the opposite side of the respective bead clamping device with respect to said shaping bladder; wherein each said annular lip extends, at rest, along the respective half-drum to cover the respective said bead clamping device and a substantial portion of the respective shaping bladder.

In a preferred embodiment of the above building drum, said lip is of such adequate width as to cover, at rest, substantially the whole respective said shaping bladder.

BRIEF DESCRIPTION OF THE DRAWINGS

A non-limiting embodiment of the invention will be described by way of example with reference to the accompanying drawings, in which.

EMBODIMENTS OF THE INVENTION

Figure 1:
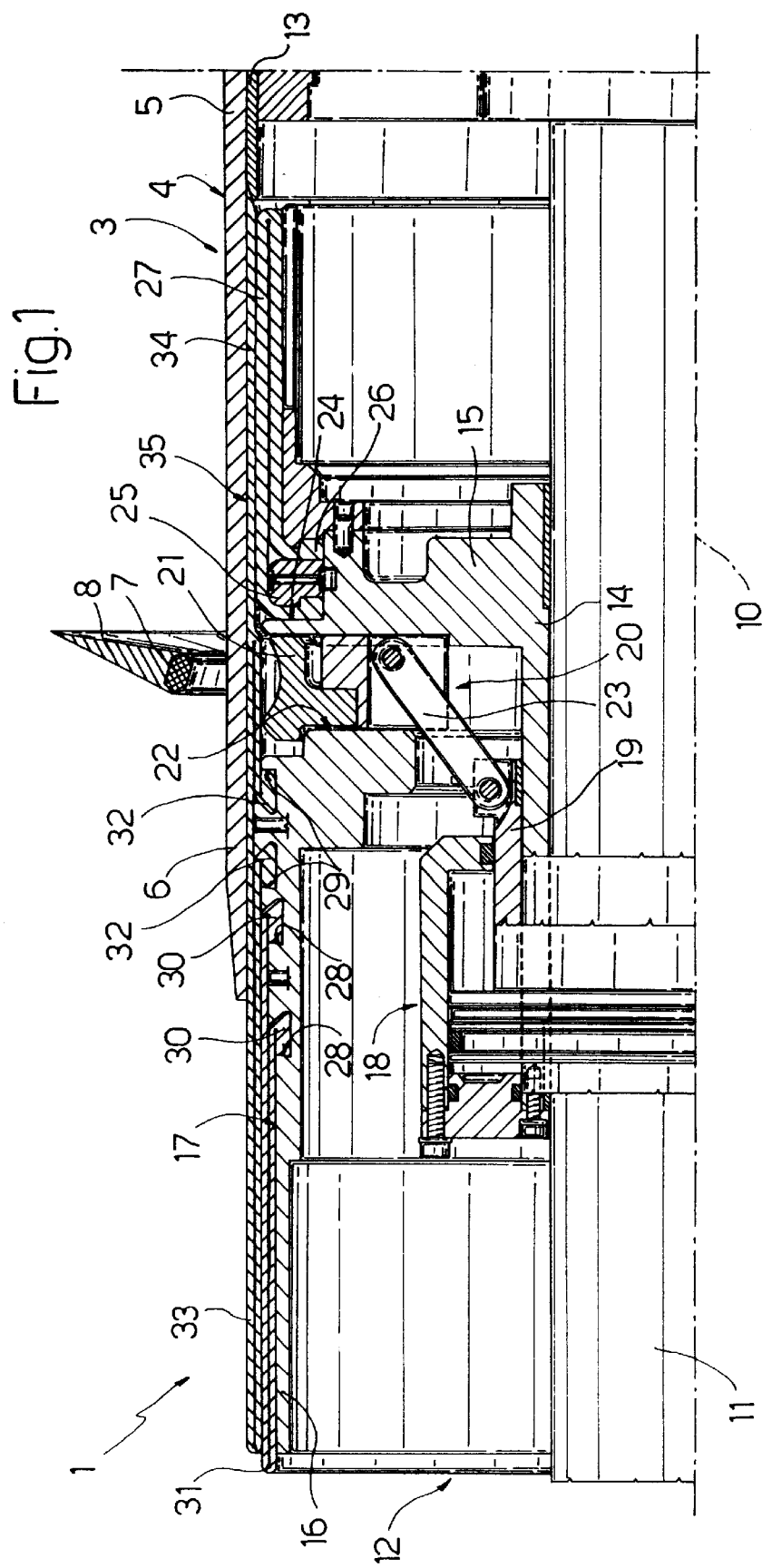
FIGS. 1 and 2 show schematic partial axial sections of a preferred embodiment of the drum according to the present invention in two different operating configurations.

With reference to the accompanying drawings, FIG. 1 shows as a whole a drum 1 for building a tire 2, which comprises a carcass 3 in turn comprising a ply 4 defined by a toroidal central portion 5 and by two lateral portions 6 (only one shown) which, when shaping carcass 3, are turned up about respective metal bead bundles 7 (only one shown), having respective bead fillers 8 on the outside, to define respective beads 9 of carcass 3.

Drum 1 is mounted to rotate about a respective axis 10, and comprises a tubular central shaft 11 coaxial with axis 10 and housing a known actuating device (not shown) for moving in opposite directions along shaft 11 two cylindrical half-drums 12 (only one shown), which are mounted to slide along shaft 11 coaxially with each other and with axis 10, and are connected to said actuating device (not shown) to slide in opposite directions along, and without rotating with respect to, shaft 11.

Drum 1 also comprises a substantially cylindrical central body 13 coaxial with and connecting half-drums 12.

Each half-drum 12 comprises a tubular central slide 14 mounted to slide along shaft 11 and comprising, at the end facing central body 13, an outer flange 15, the outer periphery of which is fitted integrally with an intermediate portion of a tubular body 16, which is coaxial with axis 10 and has an outer surface 17 defining the outer surface of respective half-drum 12 and slightly smaller in diameter than the outer surface of central body 13. At the opposite end to flange 15, slide 14 supports an annular hydraulic cylinder 18 which extends about shaft 11, coaxially with axis 10, and has a tubular output rod 19 facing flange 15 and which is coaxial with axis 10 and slides on slide 14 to and from flange 15.

Figure 2:
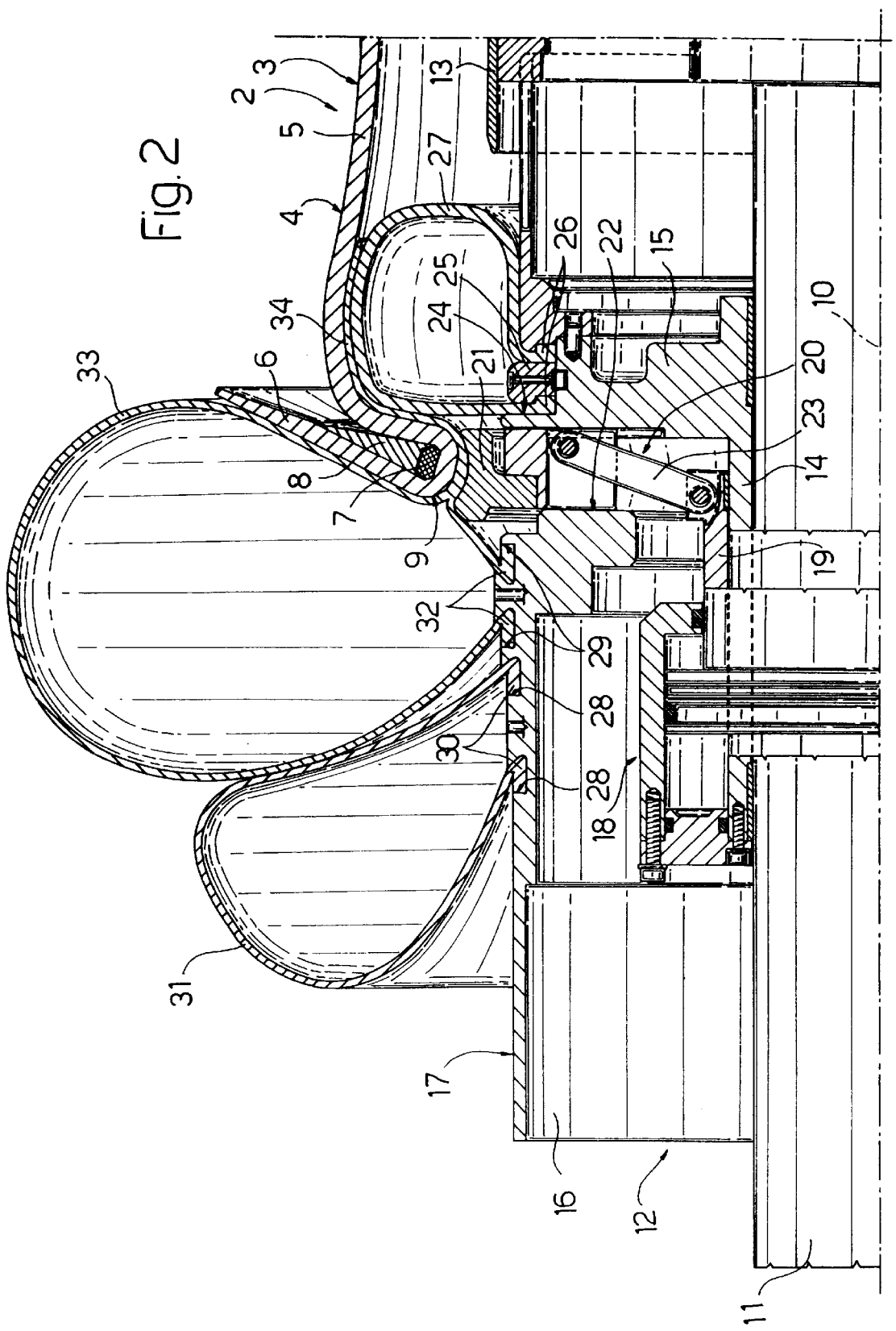

Cylinder 18 defines the actuating device of a respective bead clamping device 20 comprising a number of sectors 21, each of which is mounted to slide along a respective radial passage 22 formed through flange 15, and is connected at the bottom, by means of a respective connecting rod 23, to the end of tubular rod 19 facing flange 15, so as to move, by means of hydraulic cylinder 18, between a withdrawn rest position (FIG. 1) in which sector 21 is housed inside respective passage 22, and a partly extracted work position (FIG. 2) clamping respective bead bundle 7.

The portion of surface 17 of tubular body 16 extending between bead clamping device 20 and central body 13 has an annular groove 24, in which both the annular end shoes 26 of an annular shaping bladder 27 are locked removably, adjacent to each other and to sectors 21, by means of an annular insert 25. Insert 25 is locked removably between the two shoes 26 inside groove 24; and, in the deflated rest configuration (FIG. 1), shaping bladder 27 rests on surface 17 and extends along tubular body 16 to almost contact the respective axial end of central body 13.

The portion of surface 17 of tubular body 16 extending on the opposite side of bead clamping device 20 with respect to shaping bladder 27 has two pairs of annular grooves 28 and 29, with grooves 29 interposed between grooves 28 on one side and bead clamping device 20 on the other. Inside the two adjacent grooves 28 are pressed respective annular end shoes 30 of an annular thrust bladder 31 which, in the deflated rest configuration (FIG. 1), rests on surface 17 and extends along tubular body 16 in the opposite direction to shaping bladder 27.

Inside the two adjacent grooves 29 are pressed respective annular end shoes 32 of an annular turn-up bladder 33 which, in the deflated rest configuration (FIG. 1), rests on thrust bladder 31.

Each annular turn-up bladder 33 comprises a respective outer annular lip 34 oriented towards central body 13 and resting (at rest) over sectors 21 of respective bead clamping device 20 and over at least a substantial portion—but preferably, as in the example shown, over the whole—of respective shaping bladder 27, so as to define at rest (FIG. 1), together with turn-up bladder 33 and the outer surface of central body 13, a substantially cylindrical surface 35 coaxial with axis 10 and for receiving the ply 4, of a tire 2 being formed, covered towards surface 35 with a coating skim not shown.

In actual use, when shaping and turn-up bladders 27 and 33 are inflated to shape carcass 3 and turn ply 4 up about bead bundles 7, each annular lip 34 is interposed between the respective expanding shaping bladder 27 and the coating skim (not shown) of ply 4 so that no lubricant of any kind is required. Moreover, given its relatively large transverse dimensions, each annular lip 34 is not only in no danger of exposing respective sectors 21, but also folds about respective bead bundle 7, as shown clearly in FIG. 2, to keep the bead bundle in position on respective bead clamping device 20.

The invention is not limited to the above embodiments. The claims follow.

What is claimed is:

1. A drum for building tires, the drum comprising two half-drums, each of which comprises a substantially cylindrical outer tubular body, a bead clamping device expandable through said tubular body, at least one shaping bladder, first fastening means for connecting said shaping bladder to said tubular body, a turn-up bladder having an outer annular lip extending towards the respective shaping bladder, and second fastening means for connecting said turn-up bladder to said tubular body on the opposite side of the respective bead clamping device with respect to said shaping bladder; wherein each said annular lip extends, at rest, along the respective half-drum to cover the respective said bead clamping device and a substantial portion of the respective shaping bladder.

2. The drum as claimed in claim 1, wherein said lip is of such a width as to cover, at rest, substantially the whole respective said shaping bladder.

3. The drum as claimed in claim 1 wherein each said shaping bladder comprises two annular fastening shoes; said first fastening means comprising an annular groove formed in said tubular body and housing both said annular shoes, and an insert fixed removably inside said groove between said two annular shoes.

4. The drum of claim 2, wherein each said shaping bladder comprises two annular fastening shoes; said first fastening means comprising an annular groove formed in said tubular body and housing both said annular shoes, and an insert fixed removably inside said groove between said two annular shoes.

* * * * *